Figure 1:
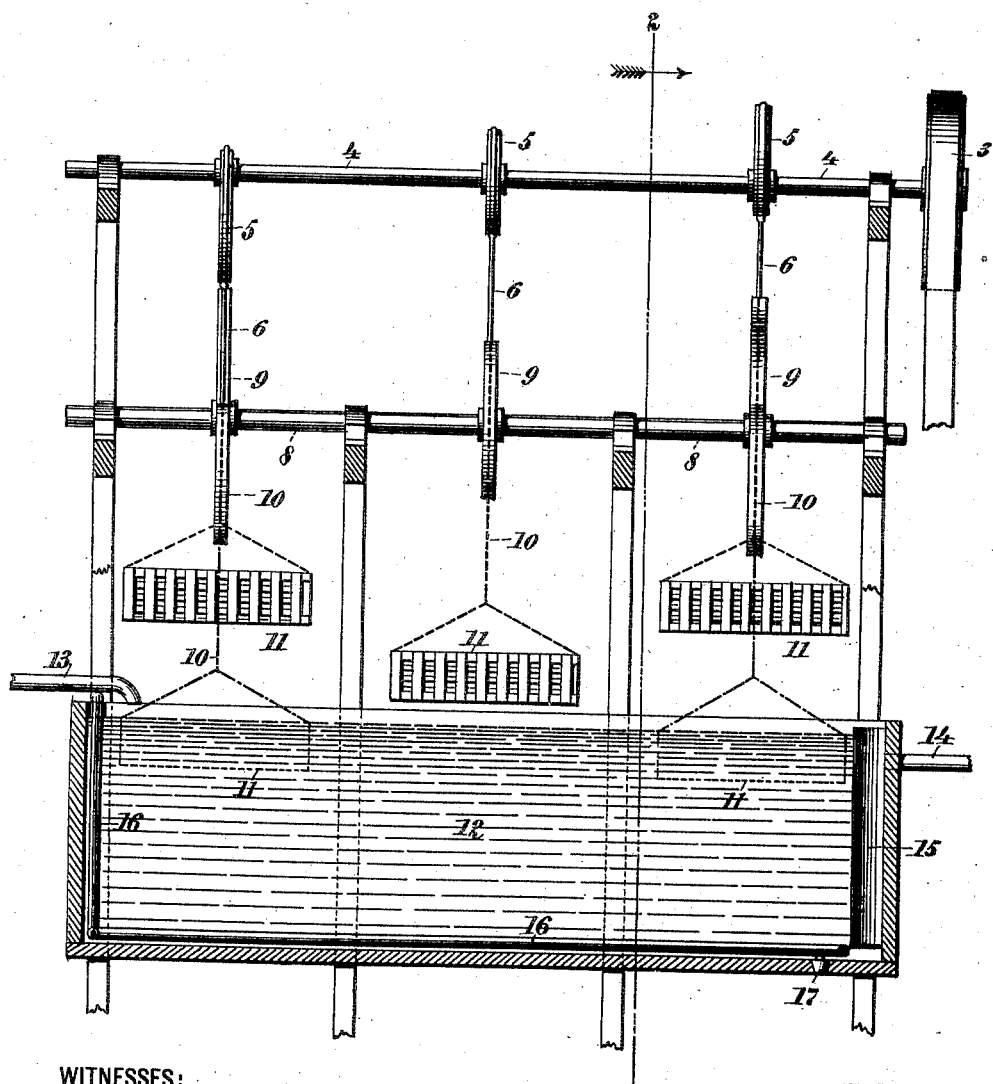

No. 788,862. PATENTED MAY 2, 1905.
A. L. WALKER.
PROCESS OF MAKING COPPER SULFATE.
APPLICATION FILED APR. 14, 1904.

2 SHEETS—SHEET 1.

WITNESSES:

INVENTOR
Arthur L. Walker
BY
Horace A. Davis
ATTORNEY

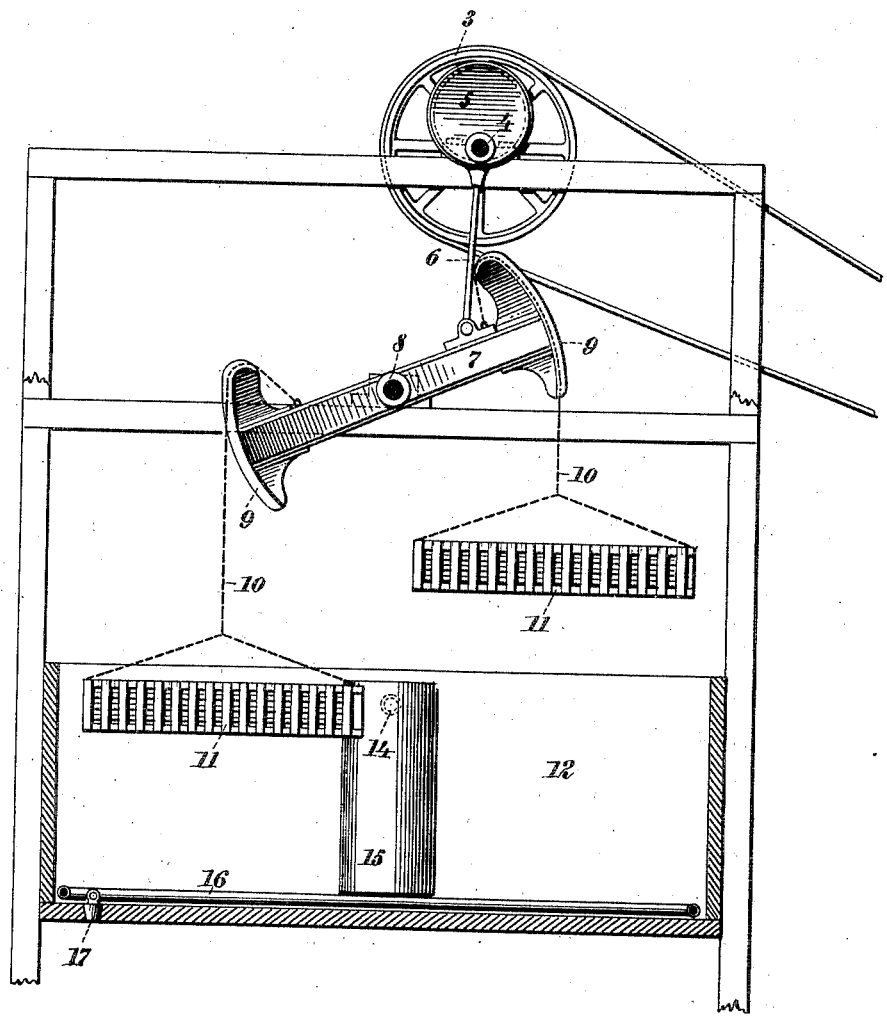

No. 788,862.

Patented May 2, 1905.

UNITED STATES PATENT OFFICE.

ARTHUR L. WALKER, OF NEW YORK, N. Y.

PROCESS OF MAKING COPPER SULFATE.

SPECIFICATION forming part of Letters Patent No. 788,862, dated May 2, 1905.

Application filed April 14, 1904. Serial No. 203,214.

*To all whom it may concern:*

Be it known that I, ARTHUR L. WALKER, a citizen of the United States, residing in the city of New York, county of Richmond, and State of New York, have invented a new and useful Process of Producing Sulfate of Copper from Copper and Sulfuric Acid, of which the following is a specification.

My invention relates to the production, by the chemical reaction of sulfuric acid upon oxid of copper, of sulfate of copper in a form ready for crystallization into the commercial product known as "blue vitriol." Its object is to obtain economically a continuous, rapid, and complete combination of the elements employed in a concentrated form ready for crystallization.

The present method of producing blue vitriol consists of placing shot-copper in towers through which a solution of hot sulfuric acid is allowed to flow intermittently. As the acid passes over the copper it unites chemically with so much of the copper as has been oxidized by the action of the air, forming by reaction sulfate of copper. As the dissolving solution drains off the air reaches the copper again, slightly oxidizing it while the solution is being reheated and pumped up again for another flow. This operation is continued until the solution is saturated, after which it is frequently necessary, if a diluted form of sulfuric acid has been used, to concentrate in order to bring the solution to the crystallizing-point. After saturation and concentration the solution is crystallized. This method is slow and intermittent and on account of slimy impurities deposited on the copper effects only a partial combination of the elements employed. A residuum of copper coated with slime is left at the bottom of the towers, which then have to be cleaned out. The smaller pieces of copper are lost in washing out the towers, while the larger pieces have to be replaced in the towers and submitted to a new operation. The concentrated solution also contains more or less gold and silver, which is carried into the blue vitriol in crystallization. The present method is also objectionable economically on account of the wear and tear of the acid on the pumps used to lift the solution after each flow and the power required to move and remove the liquid.

By the process which constitutes my invention the above-mentioned difficulties are obviated in the following manner: The solution containing the sulfuric acid is run into a tank or series of tanks. The shot-copper is placed in baskets or perforated boxes, which are alternately immersed in the acid and withdrawn therefrom, the baskets being preferably so arranged that at all times at least one is in contact with the acid. A heating-coil placed in the bottom of the tanks keeps the solution at a proper temperature. Near the top of the tank is provided an outlet-pipe connecting directly with the crystallizing-pans, and around the outlet-pipe, extending downward to a level near the bottom of the tank, is placed a shield which allows only the heavy concentrated solution of sulfate of copper which has settled to the lower part of the tank and passed under the shield to reach the outlet, from which it emerges in a suitable condition for crystallization. The gold and silver contained in argentiferous copper settle to the bottom of the tank, thereby reducing the amount of foreign matter contained in the crystallized blue vitriol. The immersion of a basket containing copper brings such copper, which has been partly oxidized by the action of the air in the same manner as under the present method, into contact with the acid. When the basket is withdrawn, the acid drains through the interstices of the basket back into the tank, and as the air circulates freely through the basket it produces further oxidation more rapidly than when the copper remains stationary in a tower. At each subsequent immersion the slime is washed off the copper and falls to the bottom of the tank, whence it can be removed through a suitable opening. In this way the copper is dissolved more rapidly and perfectly than under the present system. The sulfate of copper, being heavier than the sulfuric acid, sinks toward the lower part of the tank, with the most concentrated solution at the bottom. A new supply of acid solution is fed continuously into the tank, while through the outlet-pipe a constant flow of sulfate of copper into the crystallizing pans or tanks is maintained. The solution is maintained at a proper temperature and evaporated, if desired, by the heating-coil in the bottom of the tank. The operation thus becomes continuous and at the same time produces a more rapid and perfect combination of elements in a concentrated form ready for crystallization. It is also economical in avoiding entirely the use of pumps, in utilizing all the copper at a rate from two to four times as fast as under the present method, in saving the gold and silver contained in the ore, and in reducing greatly the amount of power required for operation. Such saving of power is further effected by operating the baskets in pairs, arranged substantially to balance each other at the respective ends of a walking-beam.

The accompanying drawings, in which like reference-numerals refer to like parts of the device, represent a specimen of apparatus containing a tank with three pairs of baskets for carrying out the invention.

Figure 1 is a front elevation of the apparatus. Fig. 2 is a sectional view through the line 2 2 of Fig. 1.

Referring to the drawings in detail, 3 is a wheel revolving slowly on the shaft 4, which carries the eccentrics 5. Each eccentric is connected by the pitman 6 to the walking-beam 7, oscillating upon the shaft 8. At each end of the walking-beam 7 is the end piece 9, over which rides the chain 10. The end piece 9 is curved in the arc in which the end of the beam travels, so that the basket 11, which is suspended at the end of the chain 10 and contains the shot-copper, always moves up and down in a straight line. Under the walking-beam 7 is the tank 12, containing the sulfuric-acid solution, at a suitable distance to permit the basket 11 to be immersed therein on the downward stroke of the beam and to be wholly withdrawn therefrom on its upward stroke. Sulfuric acid is fed to the tank 12 by the pipe 13, while sulfate of copper flows out through the outlet 14. The shield 15 surrounds the outlet 14 from a point above the level of the sulfuric acid in the tank to a point near the bottom of the tank. The tank is also provided with a heating-coil 16 and an aperture in the bottom closed by the plug 17, through which the slime may be washed out at suitable intervals.

What I claim, and desire to secure by Letters Patent, is—

1. The process of producing sulfate of copper economically, continuously, rapidly, with the complete combination of the elements employed and in a form ready for crystallization, by the alternate immersion of shot-copper in, and its withdrawal from, a receptacle into which is continuously fed a solution of sulfuric acid and from which the concentrated solution of sulfate of copper is continuously withdrawn.

2. The process of a rapid and continuous production of sulfate of copper by the chemical reaction of sulfuric acid in tanks upon copper alternately immersed in such tanks and withdrawn therefrom.

3. The process of producing sulfate of copper rapidly, economically and with the complete combination of the elements employed, by the alternate immersion of shot-copper in, and its withdrawal from, a heated solution of sulfuric acid.

4. The process of producing sulfate of copper by maintaining a pool of sulfuric-acid solution of sufficient depth to permit the heavier liquid to accumulate at the bottom, and into such pool repeatedly immersing shot-copper and withdrawing it therefrom.

5. The process of producing sulfate of copper in a form ready for crystallization by withdrawing from the bottom of a deep pool of sulfuric-acid solution the heavy concentrated solution resulting from alternately immersing shot-copper in such pool and withdrawing it therefrom.

6. The process of producing sulfate of copper economically, continuously, rapidly, with the complete combination of the elements employed and in a form ready for crystallization by alternately immersing shot-copper in, and withdrawing it from a receptacle containing a deep pool of sulfuric-acid solution, continuously fed and heated, from the bottom of which the heavier liquid is continuously withdrawn.

Signed at Perth Amboy, New Jersey, April 12, 1904.

ARTHUR L. WALKER.

In presence of—
EDMOND DE MONSEIGLE,
A. H. TYROLER.